United States Patent [19]
Baker

[11] Patent Number: 5,943,297
[45] Date of Patent: Aug. 24, 1999

[54] CALENDAR CLOCK CIRCUIT FOR COMPUTER WORKSTATIONS

[75] Inventor: Thomas H. Baker, Ft. Collins, Colo.

[73] Assignee: Hewlett-Packard Co., Palo Alto, Calif.

[21] Appl. No.: 08/850,123

[22] Filed: May 1, 1997

Related U.S. Application Data

[63] Continuation of application No. 08/292,566, Aug. 19, 1994, abandoned.

[51] Int. Cl.[6] .............................. G04B 47/00; G04F 5/00; G06F 15/02
[52] U.S. Cl. ........................ 368/10; 368/156; 364/705.07
[58] Field of Search .................................. 368/10, 28, 29, 368/82–84, 155–157; 364/705.07, 705.08, 709; 377/15, 20

[56] References Cited

U.S. PATENT DOCUMENTS

| | | | |
|---|---|---|---|
| 3,891,973 | 6/1975 | Maxwell | 340/172.5 |
| 4,181,963 | 1/1980 | Yanagawa | 364/705 |
| 4,276,606 | 6/1981 | Harigaya et al. | 364/709 |
| 4,330,840 | 5/1982 | Robayashi | 364/705 |
| 4,348,743 | 9/1982 | Dozier | 364/900 |
| 4,468,133 | 8/1984 | Sasaki | 368/156 |
| 5,487,054 | 1/1996 | Capps et al. | 368/185 |
| 5,487,096 | 1/1996 | Pearson et al. | 377/185 |
| 5,514,945 | 5/1996 | Jones | 320/14 |
| 5,514,946 | 5/1996 | Lin et al. | 320/31 |
| 5,533,123 | 7/1996 | Force et al. | 380/4 |
| 5,678,019 | 10/1997 | Podkolda et al. | 395/405 |

OTHER PUBLICATIONS

Epson America, Inc., "Specification for Real Time Clock Module RTC–62421", Aug. 1986.

*Primary Examiner*—Vit Miska

[57] ABSTRACT

A computer date and time clock including an incrementing binary 32 bit register, used to main elapsed date and time in seconds, and an external 1 Hz clock signal, provided by an oscillator, that increments the register. The oscillator and register are both powered by a battery, to make them independent of computer system power. On computer systems having a 32 bit bus, the register can be read or written with a single I/O cycle on the system bus. Operating system software typically performs time calculations using elapsed seconds since a fixed date and time, thus the register count can represent a number of seconds since the fixed date and time. The 1 Hz clock signal is derived from a higher frequency oscillator using a divider circuit, and a reset circuit within the date and time clock clears the divider circuit each time data is stored in the register.

10 Claims, 2 Drawing Sheets

CALENDAR CLOCK CIRCUIT FOR COMPUTER WORKSTATIONS

CROSS REFERENCE TO RELATED APPLICATION

This is a continuation of application Ser. No. 08/292,566 filed on Aug. 19, 1994, now abandoned.

FIELD OF THE INVENTION

This invention relates to computer systems and more particularly to date and time clock circuits within such computer systems. Even more particularly, the invention relates to a date and time clock circuit for a computer workstation.

BACKGROUND OF THE INVENTION

Nearly every computer system maintains a clock that tracks hours, minutes, seconds, day, month, and year. This is typically done in a real time clock module, such as the RTC-62421 available from Epson America, Inc., or the MC146818 available from Motorola, Inc. These clock modules run from battery power, thus they maintain date and time even though the computer system is turned off. Typically, these modules use binary coded decimal format to provide the date and time to the computer system. These clock modules are very sophisticated in that they include a calendar so that they can correctly increment the month based on how many days are in each month, they correct the date in leap years, etc.

One problem with this type of system is that several read operations are necessary in order to extract all the date and time information from the module, because of the number of bytes of data needed to hold the complete date and time. Thus, between reads of various parts of the information, the information may be updated, so that by the time all the information is collected, it is outdated. Another problem with this type of clock module is that some operating systems keep track of the date and time as a number of seconds since a previous fixed date and time. For example, the Unix operating system keeps track of date and time as a binary number of seconds since Jan. 1, 1970, and the MSDOS operating system, used in IBM personal computers, measures date and time in seconds from Jan. 1, 1980. Thus, in either of these systems, the binary coded decimal form at supplied by the real time clock module must be converted to a pure binary integer by software within the operating system.

Another prior art solution to keeping date and time is to interrupt the processor with a 60 Hz interrupt, as was done in the original IBM PC, and allow a software process within the operating system to maintain the date and time of day. An obvious drawback to this solution is the amount of processor cycles required simply to maintain the date and time.

There is need in the art then for a system that maintains a binary count of date and time, rather than binary coded decimal. There is further need in the art for such a system that relieves software within the host operating system from the necessity of maintaining the date and time. The present invention meets these and other needs in the art.

SUMMARY OF THE INVENTION

It is an aspect of the present invention to maintain date and time within a computer system as a 32 bit count of seconds.

It is another aspect of the invention to maintain such a count of seconds even when power is removed from the computer system.

Still another aspect of the invention is to provide such a binary number that can be read or written with a single input/output operation.

A further aspect of the invention is to reset the incrementing signal whenever data is written to the count register, so that a full second will elapse before the next increment.

The above and other aspects of the invention are accomplished in an incrementing binary 32 bit register used to maintain elapsed date and time in seconds. An external 1 Hz clock signal, provided by an oscillator, is used as the reference to increment the register. The oscillator and the incrementing binary 32 bit register are both powered by a battery, thus, they are independent of computer system power. Since the register is 32 bits wide, on computer systems having a 32 bit bus, the register can be read or written with a single I/O cycle of the system bus, thus avoiding having the counter update during a read.

Operating system software typically performs time calculations using elapsed time from a fixed date and time. Since the incrementing binary 32 bit register maintains a count of seconds, this count can be a number of seconds since any desired previous date, thus, making the clock independent of the particular date from which the time is referenced. Further, a 32 bit register provides sufficient count to encode 136 years, thus, the clock is capable of maintaining a long period of time. Since time and date may easily be derived from an elapsed number of seconds, and formatted into many different formats and calendars, the system has wide flexibility.

Reset logic detects a write operation to the 32 bit incrementing register, and clears the oscillator circuit when a write occurs, so that a full second will pass before the register is updated again after information is stored into the register.

BRIEF DESCRIPTION OF THE DRAWINGS

The above and other objects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
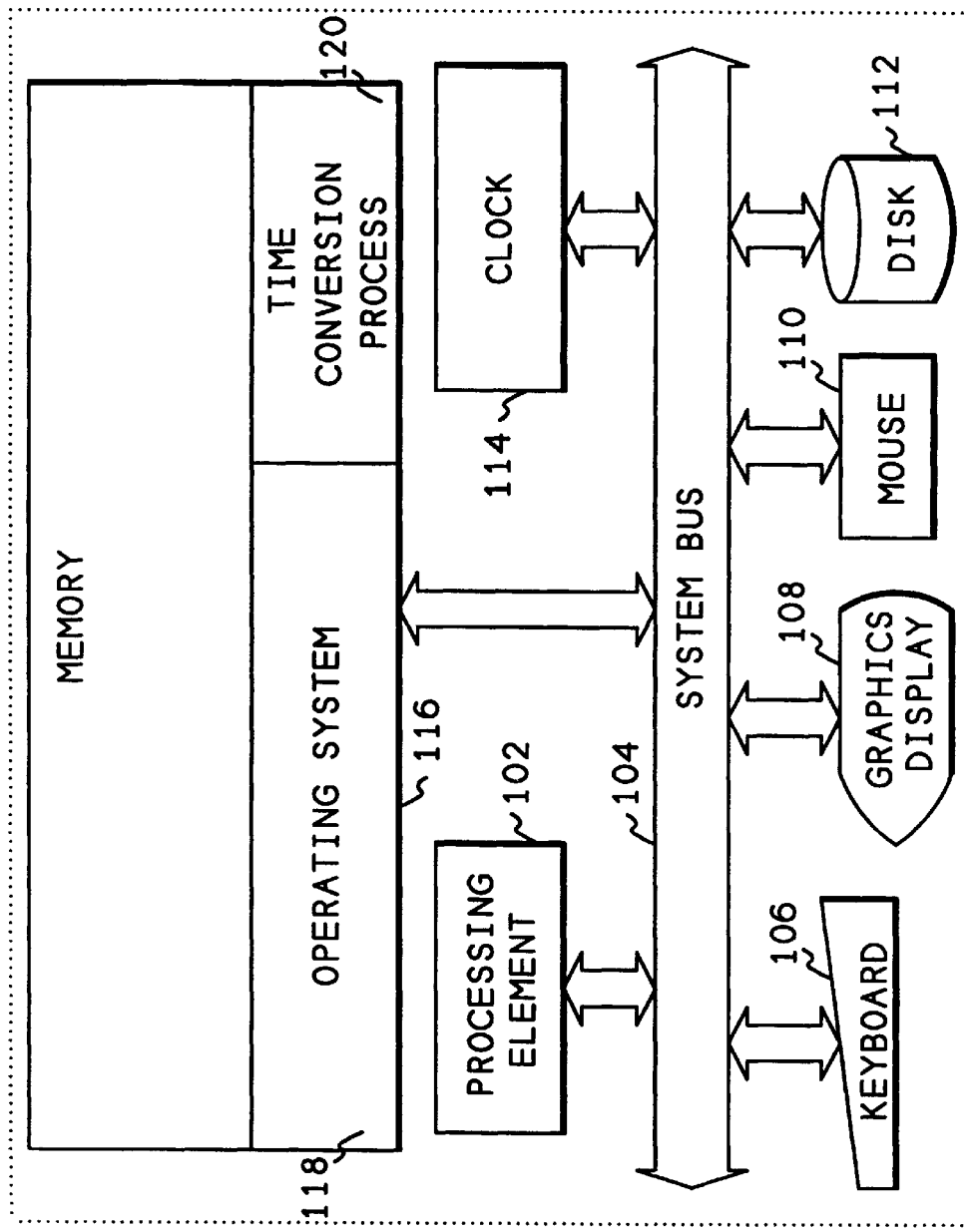
FIG. 1 shows a block diagram of a computer system incorporating the clock circuit of the present invention.

FIG. 1 shows a block diagram of the hardware and software of the invention. Referring now to FIG. 1, a computer system 100 contains a processing element 102 which communicates to other elements of the computer system 100 over a system bus 104. The system bus 104 typically contains a 32 bit wide data bus. A keyboard 106 allows a user of the system 100 to input commands and data into the computer system 100, and a mouse 110 allows the user to input graphical information into the computer system 100. A display 108 allows the computer system 100 to output information to the user of the system, and a disk 112 stores the software and data used by the system.

The real time clock module 114 of the present invention connects to the system bus 104 to allow an operating system 118, and time conversion process software 120, to access the current date and time from the real time clock module 114, or to store a new date and time value into the real time clock module 114.

Figure 2:
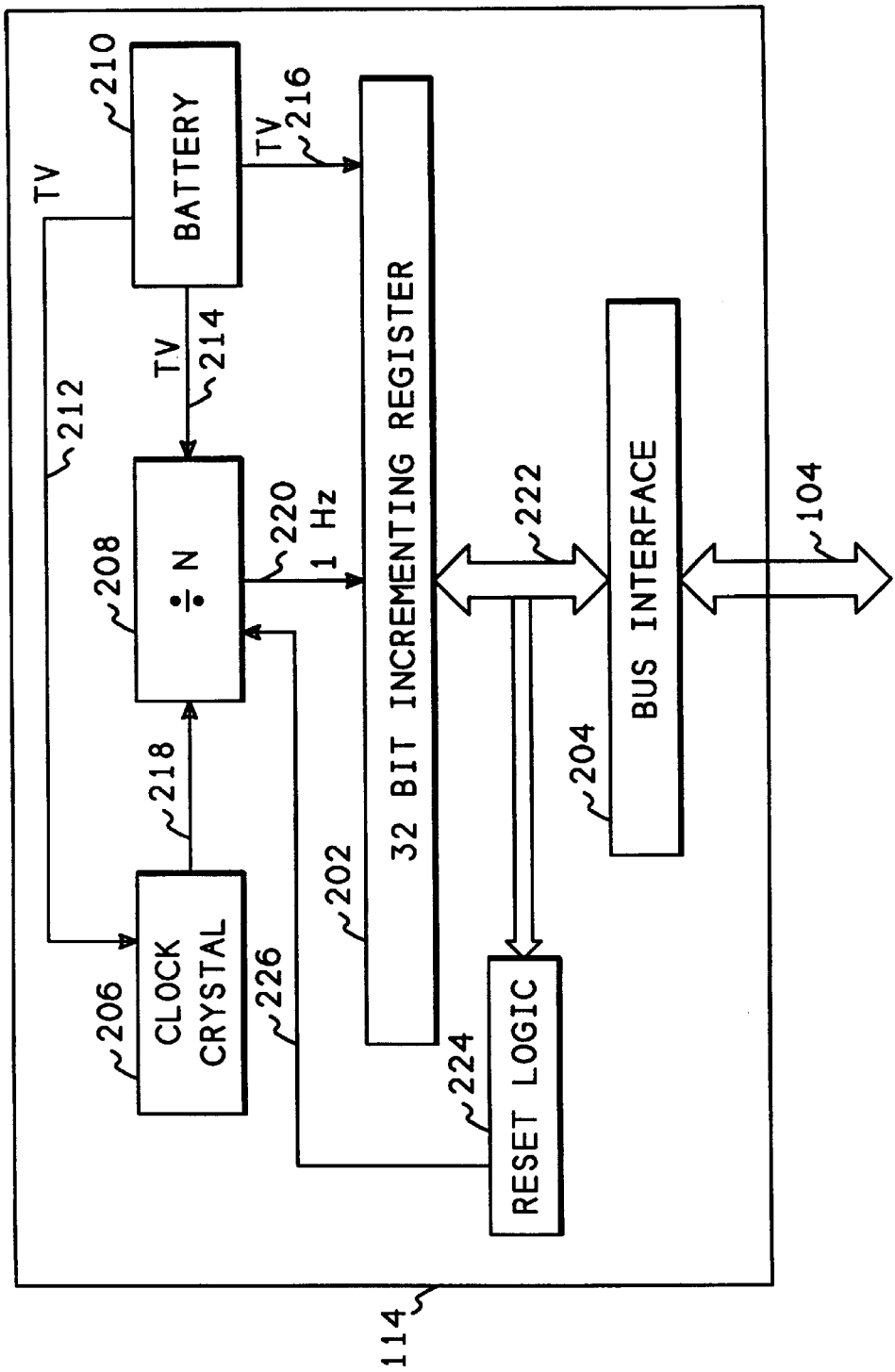
FIG. 2 shows a block diagram of the clock circuit of the present invention.

FIG. 2 shows a block diagram of the clock module 114 of FIG. 1. Referring now to FIG. 2, the clock module 114 has a 32 bit incrementing register 202 which is connected to the system bus 104 (also shown in FIG. 1) through a bus interface 204 and a bus 222.

An incrementing signal 220 is input to the 32 bit incrementing register to cause it to increment at a 1 Hz rate, thus, the register counts seconds. The 1 Hz signal 220 is created from a clock crystal 206 whose output 218 is connected to a divide by N register 208. The value for N depends upon the frequency of the clock crystal, wherein N is whatever number is necessary to divide the clock crystal frequency down to a 1 Hz rate. Those skilled in the art will recognize that the signal 220 could increment the 32 bit incrementing register at a rate other that 1 Hz if a higher or lower resolution of the date and time is desired.

A battery 210 supplies power to the clock crystal 206 over a power line 212; it supplies power to the divide by N counter 208 over a power line 214; and it also supplies power to the 32 bit incrementing register 202 over a power line 216. The battery 210 allows the 32 bit incrementing register to continuously increment at a one second rate, even when power is removed from the computer system and the interface 204. The bus interface 204 is powered by the computer system, since there is no need to interface the 32 bit incrementing register to the bus when the computer system is not powered on.

Typically, the clock crystal 206 would run at a frequency of 32.768 kHz. This frequency is then divided by the divide by N counter 208 to a 1 Hz signal, using a 15 bit counter chain within the divide by N counter 208.

Reset logic 224 detects a write operation to the 32 bit incrementing register 202, and sends a reset signal 226 to cause the divide by N counter 208 to clear, so that a full second will pass before the register is updated again after information is stored into the register 202.

Typically, the time conversion process software 120 (FIG. 1) would store a binary number equal to the number of years, months, days, hours, minutes, and seconds since a fixed date and time into the 32 bit incrementing register. For the Unix operating system, the fixed date and time is Jan. 1, 1970, and for the PC-DOS operating system, the fixed date and time is Jan. 1, 1980. Once this number is stored into the 32 bit incrementing register, the register will maintain the number of seconds since the fixed date and time.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departing from the spirit and scope of the present invention. The disclosures and the description herein are intended to be illustrative and are not in any sense limiting of the invention, more preferably defined in scope by the following claims.

What is claimed is:

1. A real time clock module, comprising:
   a) an oscillator circuit;
   c) an incrementing register, connected to an increment signal output of the oscillator circuit, for maintaining a continuous binary count of time increments which have elapsed since a fixed date;
   d) an interface circuit, connected to an I/O port of the incrementing register, for performing reads and writes of the incrementing register; and
   e) reset logic for,
      i) detecting a write to the incrementing register; and
      ii) clearing the oscillator circuit upon detection of a write to the incrementing register;
   whereby the oscillator circuit's generation of increment signals is synchronized with the write of a new binary count to the incrementing register.

2. A real time clock module as in claim 1, wherein the oscillator circuit comprises:
   a) a clock crystal; and
   b) a signal dividing circuit connected to an output of the clock crystal;
   wherein:
      A) the increment signal output is an output of the signal dividing circuit; and
      B) the reset logic clears the oscillator circuit by delivering a reset signal to an input of the signal dividing circuit.

3. A real time clock module as in claim 1, wherein the incrementing register and interface circuit are connected via a bus, and the reset logic detects a write to the incrementing register by monitoring signals carried over the bus.

4. A real time clock module as in claim 1, wherein the oscillator circuit and incrementing register are powered separately from the interface circuit such that the binary count may be maintained regardless of whether the interface circuit is powered.

5. A real time clock module as in claim 1, wherein:
   a) the continuous binary count of time increments is a count of seconds; and
   b) the reset logic's clearing of the oscillator circuit upon detection of a write to the incrementing register results in a full second delay before further incrementation of the continuous binary count of time increments.

6. A computer, comprising:
   a) a bus;
   b) a processing element connected to the bus;
   c) a memory, connected to the bus and having a time conversion process stored therein; and
   d) a real time clock module, comprising:
      i) an oscillator circuit;
      ii) an incrementing register, connected to an increment signal output of the oscillator circuit, for maintaining a continuous binary count of time increments which have elapsed since a fixed date;
      iii) an interface circuit, connected between an I/O port of the incrementing register and the bus, for performing reads and writes of the incrementing register; and
      iv) reset logic for,
         aa) detecting a write to the incrementing register; and
         bb) clearing the oscillator circuit upon detection of a write to the incrementing register;
      whereby the oscillator circuit's generation of increment signals is synchronized with the write of a new binary count to the incrementing register; and
   wherein:
      A) the time conversion process causes the processing element to read the binary count from the incrementing register, via the interface circuit, in a single read operation;

B) the binary count is processed within the time conversion process so as to generate current time and/or date information; and C) a new binary count is written to the incrementing register under control of the processing element, via the interface circuit, in a single write operation.

7. A computer as in claim 6, wherein the oscillator circuit comprises:

a) a clock crystal; and b) a signal dividing circuit connected to an output of the clock crystal;

wherein:

A) the increment signal output is an output of the signal dividing circuit; and

B) the reset logic clears the oscillator circuit by delivering a reset signal to an input of the signal dividing circuit.

8. A computer as in claim 6, wherein:

a) the continuous binary count of time increments is a count of seconds; and b) the reset logic's clearing of the oscillator circuit upon detection of a write to the incrementing register results in a full second delay before further incrementation of the continuous binary count of time increments.

9. A method of maintaining and synchronizing time and date information, comprising the steps of:

a) maintaining a binary count which may be read or written under computer control;

b) independent of computer control,
   i) generating a periodic signal; and
   ii) maintaining a count of elapsed periods of said periodic signal;

c) after a predetermined number of elapsed periods have been counted,
   i) incrementing the binary count; and
   ii) resetting the count of elapsed periods; and d) each time the binary count is written under computer control, resetting the count of elapsed clock periods so as to synchronize the writing and incrementing of the binary count.

10. A method as in claim 9, wherein:

a) the step of maintaining a count of elapsed periods of said periodic signal is equivalent to counting seconds; and b) the step of resetting the count of elapsed clock periods each time the binary count is written under computer control comprises delaying incrementation of the binary count for a full second after the binary count is written.

\* \* \* \* \*